United States Patent
Park

(10) Patent No.: US 12,422,819 B2
(45) Date of Patent: Sep. 23, 2025

(54) INTERIOR DESIGN PRODUCT FABRICATING SYSTEM

(71) Applicant: Sang Hun Park, Mungyeong-si (KR)

(72) Inventor: Sang Hun Park, Mungyeong-si (KR)

( * ) Notice: Subject to any disclaimer, the term of this patent is extended or adjusted under 35 U.S.C. 154(b) by 759 days.

(21) Appl. No.: 17/383,472

(22) Filed: Jul. 23, 2021

(65) Prior Publication Data
US 2021/0356936 A1 Nov. 18, 2021

Related U.S. Application Data

(63) Continuation-in-part of application No. 16/092,181, filed as application No. PCT/KR2017/004181 on Apr. 19, 2017, now abandoned.

(30) Foreign Application Priority Data

Apr. 27, 2016 (KR) .................. 10-2016-0051572

(51) Int. Cl.
*G05B 19/4099* (2006.01)
*B29C 64/386* (2017.01)
(Continued)

(52) U.S. Cl.
CPC ........ *G05B 19/4099* (2013.01); *B29C 64/386* (2017.08); *B33Y 50/00* (2014.12);
(Continued)

(58) Field of Classification Search
CPC ...... G05B 19/4099; G05B 2219/35134; G05B 2219/49023; G05B 2219/49008;
(Continued)

(56) References Cited

U.S. PATENT DOCUMENTS 6,165,406 A 12/2000 Jang
6,211,861 B1 * 4/2001 Rosenberg .......... G06F 3/03543
345/163

(Continued)

FOREIGN PATENT DOCUMENTS

CN 104532986 A 4/2015
CN 206209638 U * 5/2017 ............. G06F 3/039

(Continued)

OTHER PUBLICATIONS

Merrel et al, "Computer-Generated Residential Building Layouts" 2010 pp. 1-12, downloaded from chrome-extension://efaidnbmnn-nibpcajpcglclefindmkaj/https://cs.stanford.edu/people/eschkufz/docs/siggraph_asia_10.pdf (Year: 2010).*

(Continued)

*Primary Examiner* — Robert E Fennema
*Assistant Examiner* — Olvin Lopez Alvarez
(74) *Attorney, Agent, or Firm* — Revolution IP, PLLC

(57) ABSTRACT

The present invention relates to a system for fabricating an interior design product by using a 3D printer, and a method thereof, the system and method being capable of enabling a user to select a design when the user access the interior design server and selects a specific interior design product, and delivering the interior design product 5 of the selected design by fabricating the same by using a 3D printer.

4 Claims, 16 Drawing Sheets

(51) Int. Cl.
    *B33Y 50/00*           (2015.01)
    *B33Y 80/00*           (2015.01)
    *B29L 31/00*           (2006.01)

(52) U.S. Cl.
    CPC ......... *B33Y 80/00* (2014.12); *B29L 2031/722* (2013.01); *B29L 2031/776* (2013.01); *G05B 2219/35134* (2013.01); *G05B 2219/49023* (2013.01)

(58) Field of Classification Search
    CPC ....... B29C 64/386; B33Y 50/00; B33Y 80/00; B29L 2031/722; B29L 2031/776; Y02P 90/02
    See application file for complete search history.

(56) References Cited

U.S. PATENT DOCUMENTS

| | | | | |
|---|---|---|---|---|
| 7,307,619 | B2* | 12/2007 | Cunningham | G06F 3/038 345/158 |
| 9,483,771 | B2* | 11/2016 | Weerasinghe | G06F 16/951 |
| 10,430,525 | B2* | 10/2019 | Atherton | G06F 30/13 |
| 10,606,359 | B2* | 3/2020 | Levesque | G06F 3/016 |
| 10,955,922 | B2* | 3/2021 | Khare | G06F 3/04817 |
| 10,980,096 | B2* | 4/2021 | Summers | H04L 12/282 |
| 2008/0111816 | A1 | 5/2008 | Abraham | |
| 2011/0234581 | A1 | 9/2011 | Eikelis | |
| 2015/0052025 | A1 | 2/2015 | Apsley | |
| 2015/0197064 | A1 | 7/2015 | Walker | |
| 2016/0121486 | A1 | 5/2016 | Lipinski | |
| 2016/0263822 | A1 | 9/2016 | Boyd, IV | |
| 2017/0037674 | A1 | 2/2017 | Hooper | |
| 2017/0058509 | A1 | 3/2017 | Babin | |
| 2017/0076013 | A1 | 3/2017 | Grivetti | |
| 2017/0080673 | A1 | 3/2017 | Schaedler | |
| 2017/0120525 | A1 | 5/2017 | Zhang | |
| 2017/0259509 | A1 | 9/2017 | Chang | |
| 2017/0365365 | A1 | 12/2017 | White | |
| 2018/0046250 | A1* | 2/2018 | Bhaskaran | G06F 3/016 |
| 2018/0268220 | A1* | 9/2018 | Lee | G06F 18/2413 |
| 2019/0205485 | A1* | 7/2019 | Rejeb Sfar | G06F 30/13 |
| 2021/0073449 | A1* | 3/2021 | Segev | G06F 30/27 |
| 2022/0188488 | A1* | 6/2022 | Patrick | G06F 30/13 |
| 2022/0350429 | A1* | 11/2022 | Ghioni | G06F 3/016 |
| 2023/0125988 | A1* | 4/2023 | Lee | G06F 30/13 703/1 |

FOREIGN PATENT DOCUMENTS

| | | | | |
|---|---|---|---|---|
| CN | 106663295 B | * | 1/2021 | G06Q 50/10 |
| KR | 2002-0059022 | * | 7/2002 | G06F 17/60 |
| KR | 20110026362 A | * | 3/2011 | G06T 13/80 |
| KR | 10-1400875 B1 | | 11/2013 | |
| KR | 10-1334540 B1 | | 5/2014 | |
| KR | 101492375 B1 | * | 2/2015 | G06Q 50/10 |
| KR | 20170034993 A | * | 3/2017 | G06F 3/016 |
| WO | WO 2018001456 | * | 4/2018 | G06F 3/01 |

OTHER PUBLICATIONS

Mani, "A Neural Network Model for Circuit Partitioning in Floorplan Design", 1995, pp. 1676-1680, downloaded from https://ieeexplore.ieee.org/stamp/stamp.jsp?tp=&arnumber=538015 (Year: 1995).*
Google AI, "adjust lighting parameters to expand or reduce aperceived dimension", 4 pages , 2025, downloaded from https://www.google.com/search?q=adjust+lighting%0D%0Aparameters%0D%0Ato+expand+or+reduce+aperceived+dimension (Year: 2025).*
Michael Molitch, "Branch Technology is 3D Printing the Future of Construction One Wall at a Time", Jul. 2015, pp. 24, downloaded from the internet https://3dprintingindustry.com/news/branch-technology-is-3d-printing-the-future-of-construction-one-wall-at-a-time-54149/ (Year: 2015).
Airbus.com, "Pioneering bionic 3D printing", Mar. 3, 2016, pp. 5, downloaded from the internet https://www.airbus.com/ newsroom/news/en/2016/03/Pioneering-bionic-3D-printing .html (Year: 2016).
Designing Idea, "25 Best Interior Design Software Programs (Free & Paid)", 1october 2015, pp. 40 downloaded from the internet https://designingidea.com/interior-design-software/ (Year: 2015).

* cited by examiner

INTERIOR DESIGN PRODUCT FABRICATING SYSTEM

CROSS REFERENCE TO PRIOR APPLICATION

This application is a Continuation-In-Part of U.S. patent application Ser. No. 16/092,181 filed on Oct. 8, 2018 under 35 U.S.C. § 120, which is a National Stage Application of PCT International Patent Application No. PCT/KR2017/004181 filed on Apr. 19, 2017, under 35 U.S.C. § 371, which claims priority to Korean Patent Application No. 10-2016-0051572 filed on Apr. 27, 2016, which are all hereby incorporated by reference in their entirety.

TECHNICAL FIELD

The present invention relates to a system for fabricating an interior design product, and a method thereof. More particularly, the present invention relates to a system for fabricating an interior design product by using a 3D printer, and a method thereof, the system and method being capable of enabling a user to select a design by providing a simulation when the user access the interior design server and selects a specific interior design product, and delivering the interior design product of the selected design by fabricating the same by using a 3D printer.

BACKGROUND

Recently, the use of Internet communication networks and computers has spread rapidly, and the field using computers has been rapidly expanding beyond enterprise computerization work to all industrial fields.

The above trend has led to develop of a means for generating online a virtual space in association with a real space and performing interior design for the same by placing various fixtures and furniture within a limited space. The representative example of the above case may be an e-model house.

However, the conventional e-model house merely shows a video where the entire predetermined area is uniformly divided into areas having a predetermined area such as room, living room, kitchen, bathroom, etc. and displays a layout of furniture necessary for real life of the resident. However, a method of variably dividing a space according to the provided conditions is not provided.

For example, in a case where a fixed space is divided into a plurality of spaces such as office, private education institute, business counseling office, etc., a main design goal is to satisfy various conditions such as a movement path of users using the space, intensity of illumination of lights, etc. When such a method is developed, variable spatial division may be effectively performed.

For the same, as a conventional method, Korean Patent No. 10-1492375 discloses a method of dividing a virtual space by using a partition wall wherein a large virtual space provided is divided into a plurality of spaces by using a partition wall so as to satisfy various conditions, and a series of processes of applying the same in a real space is provided online.

The above conventional method divides the virtual space into a plurality of spaces by using various forms of partition walls in consideration of given conditions, and by applying the same to an offline real space enables construction of the most suitable and satisfactory space division configuration according to a customer's requirement.

Meanwhile, recently, a method of fabricating various products using a 3D printer has received a great deal of attention. In addition, when the 3D printing method is added to the conventional spatial division method, satisfying user need while saving time and money are possible.

PRIOR-ART DOCUMENTS

Patent Documents

Korean Patent Publication No. 10-2011-0105532
Korean Patent Publication No. 10-2003-0070524
Korean Registered Patent No. 10-1492375

DISCLOSURE

Technical Problem

In order to meet the above needs, the present invention is to provide a system for fabricating an interior design product by using a 3D printer, and a method thereof, the system and method being capable of enabling a user to select a design by providing a simulation when the user access an interior design server and selects a specific interior design product and fabricating the interior design product of 5 the selected design and delivering the same.

Technical Solution

According to an aspect of the present invention, the present invention includes: an interior design server providing a list of interior design products to a user terminal accessed thereto, when the user selects a specific interior design product, providing a simulation enabling a user to place the selected interior design product in a virtual space, and when the user selects the interior design product having a desired design and requests an order for the same, generating and outputting 3D printing information of the interior design product having the corresponding design; and a 3D product output center receiving the 3D printing information generated in the interior design server and fabricating the interior design product by using a 3D printer In addition, when user selects an interior design product by using the user terminal, the interior design server according to one aspect of the present invention receives from the user terminal real space information, and generates and provides a virtual space in association with the received real space information, when various types of information is received from the user terminal, the when user selects a specific interior design product enables the user to perform designing a layout in the virtual space in association with the received information, and enables the user to select a desired form and color by providing various forms and colors for the selected interior design product.

In addition, the present invention further includes a delivery center performing delivery to the user according to a delivery request, and uploading a delivery state to a delivery server so that the user identifies the delivery state, and wherein when the fabrication of the interior design product is completed, the 3D product output center transmits the delivery request to the delivery center.

In addition, the 3D printing information includes 3D image information of the partition wall, thickness information of the partition wall, internal structure information of the partition wall, and material information of the partition wall.

In addition, the interior design server according to one aspect of the present invention includes: an interface performing communication with the user terminal through a network; an input unit for receiving various selection signals from the user; a product providing unit providing the list of the interior design products to the user terminal, and enabling the user to select the interior design product by using the user terminal; a simulation providing unit requesting and receiving information required for generating the virtual space in which the real space is reflected from the user through the user terminal, providing the simulation enabling the user to place the selected interior design product by providing the virtual space in which the real space is reflected in association with the received information, and enabling the user to finally select the desired products by selecting a desired form and color through the simulation; a data transform unit generating 3D image information including the thickness information, the internal structure information, and the material information such that the interior design products according to the order are fabricated by using the 3D printer; and a transmitting unit transmitting the 3D printing information to the 3D product output center.

Meanwhile, according to another aspect of the present invention, the present invention includes: step (A) of providing, by an interior design server, a list of interior design products to a user terminal accessed thereto and when a specific interior design product is selected, providing a simulation enabling a user to place the selected interior design product in a virtual space; step (B) of generating, by the interior design server, 3D printing information of the interior design product having a corresponding design when the user select the interior design product having a desired design and places an order thereof, and transmitting the same to the 3D product output center; and step (C) of receiving, by the 3D product output center, the 3D printing information generated in the interior design server, and fabricating the interior design product by using a 3D printer.

In addition, according to another aspect of the present invention, the present invention may further include: step (D) of transmitting, by the 3D product output center, a delivery request to a delivery center when fabrication of the interior design product is completed; and step (E) of performing delivery, by the delivery center, to the user according to the delivery request, and uploading a delivery state to a delivery server such that the user identifies the delivery state.

In addition, according to another aspect of the present invention, the 3D printing information includes 3D image information of the partition wall, thickness information of the partition wall, internal structure information of the partition wall, and material information of the partition wall.

In addition, according to another aspect of the present invention, the step (A) includes: step (A-1) of accessing, by the user, the interior design server through the user terminal; step (A-2) of providing, by the interior design server, the list of the interior design product to the user terminal; step (A-3) of selecting, by the user, the desired product from the provided list of the interior design products by using the user terminal; and step (A-4) of providing, by the interior design server, the simulation enabling the user to place the selected interior design product by providing the virtual space in which a real space is reflected.

In addition, according to another aspect of the present invention, the step (A-4) includes: when the selected interior design product is a partition wall, transmitting, by the user terminal, real space information including a building name, an address, an area, horizontal and vertical lengths, a number of current lights, an intensity of illumination, an installation position to the interior design server; generating, by the interior design server, the virtual space in association with the real space information received from the user terminal; transmitting, by the user terminal, information required for dividing the generated virtual space into a plurality of spaces which includes a partition wall form, a size, whether or not to install a door, a number of persons to be accommodated in the virtual space, a number of rooms, a required intensity of illumination, and a movement path to the interior design server; generating, by the interior design server, a floor plan for dividing the virtual space into the plurality of spaces in association with the received information; selecting, by the interior design server, the partition wall for dividing the virtual space into the plurality of spaces according to the generated floor plan based on partition wall information transmitted from the user terminal; and dividing, by the interior design server, the virtual space into the plurality of spaces by using the selected partition wall, and displaying the same in a 3D manner.

An interior design product fabricating system according to an embodiment of the present invention includes a user terminal configured to request a virtual interior simulation service for interior construction of an arbitrary space to provide actual space information including a building name and an address of the arbitrary space and necessary information for dividing the arbitrary space into a plurality of small spaces, and an interior design server configured to provide the virtual interior simulation service to the user terminal and transmit a three-dimensional (3D) simulation screen, in which the arbitrary space is divided into the plurality of small spaces on the basis of the actual space information and the necessary information, to the user terminal, wherein, when there is a request from the user terminal for an operation to feel a tactile sensation of a product selected on the simulation screen, the interior design server transmits tactile data of the selected product to the user terminal to control a haptic operation.

The interior design server may use information, including a form and a size of a partition wall, the number of persons to be accommodated in each of the small spaces, and an intensity of illumination, as the necessary information.

The interior design product fabricating system may further include a 3D product output center configured to output a 3D printing output according to the form and size of the partition wall applied on the 3D simulation screen, and the interior design server may transmit 3D printing information including thickness information, internal structure information, and material information on the partition wall to the 3D product output center.

When it is determined that a user of the user terminal performs a drag operation after touching an arbitrary product, the interior design server may control the haptic operation by providing tactile data of the arbitrary product.

The interior design server may control the haptic operation by providing tactile data of an arbitrary product on the basis of the response of a pop-up window provided when a user of the user terminal touches the arbitrary product.

The user terminal may include a mouse pad configured to perform the haptic operation, and the mouse pad may include a vibration motor configured to generate vibration on the basis of the tactile data, and a communication unit configured to receive the tactile data.

The interior design server may generate tactile data of the product by changing an amplitude, a frequency, and a period (T) of a control signal for controlling the haptic operation of the user terminal.

When the arbitrary space is divided into the plurality of small spaces on the basis of the actual space information and the necessary information, the interior design server may determine a space division form on the basis of a result of deep learning of artificial intelligence (AI).

When the space division form is determined by the deep learning, the interior design server may further reflect interior trend information by period to determine the space division form.

Advantageous Effects

Recently, a method of fabricating various products using a 3D printer has received a great deal of attention, since satisfying user need and saving time and money is possible by use of the 3D printer.

BEST MODE

Hereinafter, preferred embodiments of the present invention will be described with reference to the accompanying drawings.

The terms used in this specification are those general terms currently widely used in the art, but the terms may vary according to the intention of those of ordinary skill in the art, precedents, or new technology in the art.

Also, specified terms may be selected by the applicant, and in this case, the detailed meaning thereof will be described in the detailed description. Thus, the terms used in the specification should be understood not as simple names but based on the meaning of the terms and the overall description.

Figure 1:
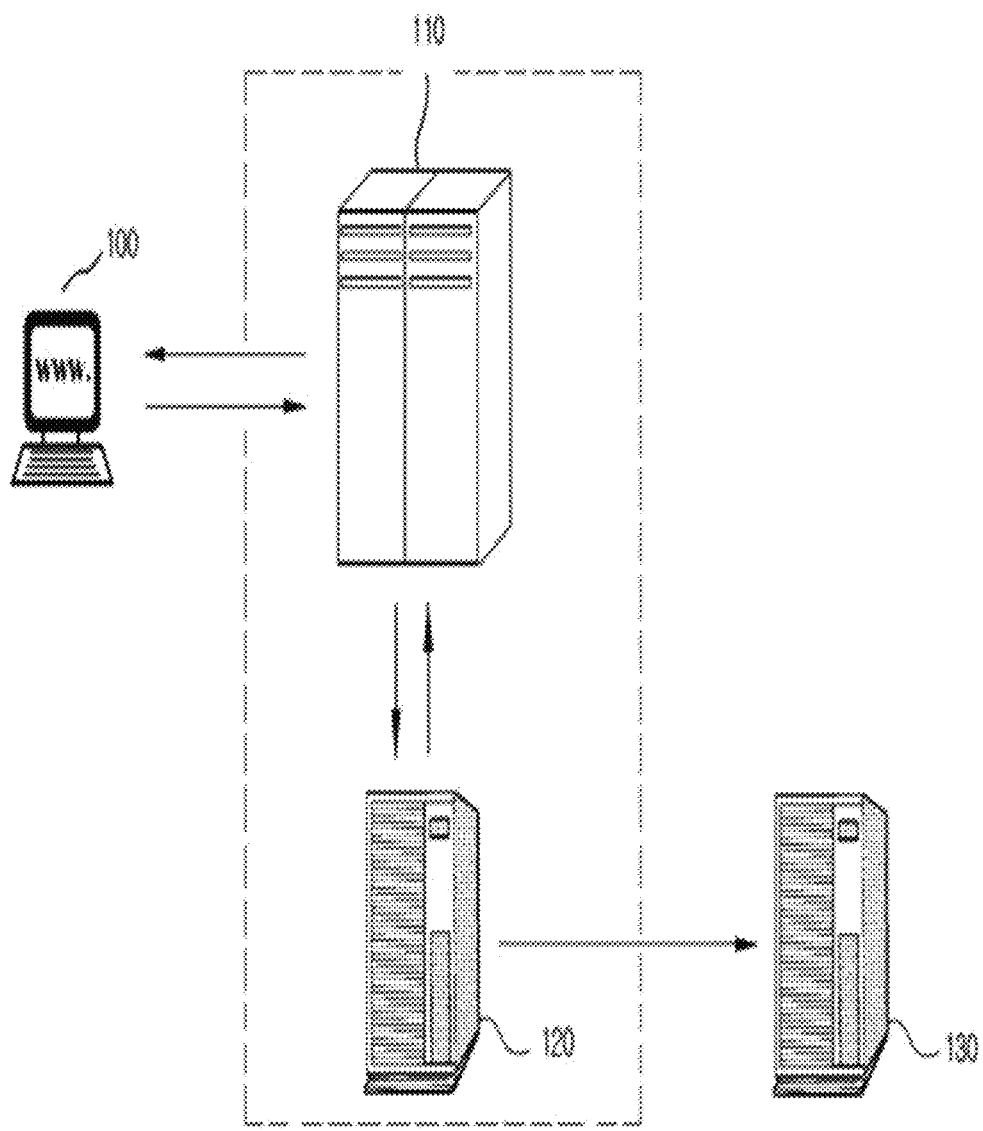
FIG. 1 is a view of a configuration showing a system for fabricating an interior design product by using a 3D printer according to the present invention.

FIG. 1 is a view of a configuration showing a system for fabricating an interior design product by using a 3D printer according to the present invention.

Referring to FIG. 1, a system for fabricating an interior design product by using a 3D printer according to the present invention includes a user terminal 100, an interior design server 110, a 3D product output center 120, and a delivery center 130.

Herein, the user terminal 100 is a terminal performing communication with the interior design server 110 through a network, and may be a personal PC that is generally used. In addition to the personal PC, various devices such as a smartphone, a tablet PC, a laptop, etc. capable of performing communication with the interior design server 110 through a wired network or wireless network may be used as the user terminal 100.

The user is provided with a 2D or 3D image design of various interior design products provided from the interior design server 110 by accessing the interior design server 110 by using the user terminal 100. Herein, the provided various interior design products may include a desk, a chair, a sofa, a table, a book case, a cabinet, a partition wall, etc. However, the above items are only illustrative examples and may include various other products.

Subsequently, when the user selects a desired product among the provided interior design products by using the user terminal 100, the interior design server 110 provides a simulation enabling the user to place the selected product in a virtual space in which a real space is reflected. By using the above simulation, the user may finally select a product of a desired design by selecting his or her favorite form and color. Of course, the user may confirm the material and surface of the product selected by the user through a dedicated device such as a mouse pad constituting the user terminal 100 in the process of selecting the favorite form and color. Accordingly, the user may feel the selected product like a real product. For example, in order to allow the user to feel a tactile sensation of the product, a haptic function may be implemented in the mouse pad by using a vibration motor, etc. Details thereof will be described below.

When a final selection is completed as above, the user makes online payment of the interior design product having a design selected by using the user terminal 100, and requests the fabrication using the 3D printer and installation thereof. A fabricating process afterward is provided through the interior design server 110, or by accessing the 3D product output center 120. In addition, a delivery process is provided by accessing the delivery center 130.

Then, the interior design server 110 provides the interior design products in a 2D or 3D image when the user terminal 100 access thereto.

Subsequently, when the user 110 selects desired interior design products among them, the interior design server receives real space information, and provides a virtual space in association with the real space to the user terminal 100. When various types of information are received from the user terminal 100, designing is performed such that the best effective layout structure is deduced in the virtual space in accordance with the information, and various forms and colors for the selected interior design product are provided so that the user may select a desired form and color.

In addition, when a fabrication order using a 3D printer for the interior design product is received from the user terminal 100, the interior design server 110 generates 3D image information, thickness information, internal structure information, and material information, and transmits the same to the 3D product output center 120 so that the interior design products according to the order 5 are fabricated by using the 3D printer.

Subsequently, in the 3D product output center 120, the interior design products are fabricated by receiving 3D image information, thickness information, internal structure information, and material information from the interior design server 110 and by using the 3D printer, and a delivery request thereof is transmitted to the delivery center 130.

Subsequently, the delivery center 130 performs delivery of the fabricated interior design products to the user according to the delivery request thereof, and provides a delivery state by uploading the same to a delivery server so that the user is able to identify the delivery state.

Figure 2:
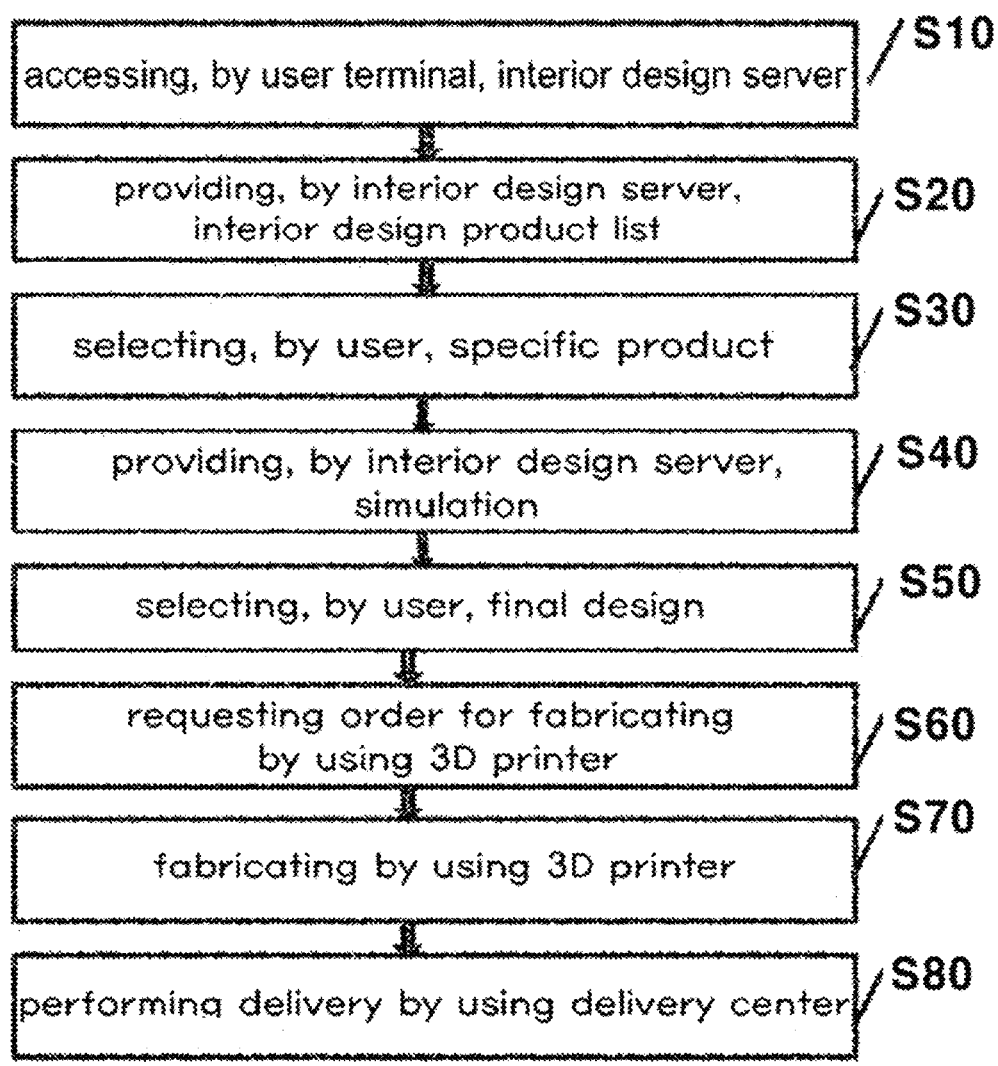
FIG. 2 is a view of a flowchart showing a method of fabricating 5 an interior design product by using a 3D printer according to the present invention.

Meanwhile, a method of fabricating an interior design product by using a 3D printer according to the present invention is shown in FIG. 2.

First, in step S10, the user may access the interior design server 110 by using the user terminal 100, and in S20, the interior design server 110 may provide a list of various interior design products to the user terminal 100 in a 2D or 3D image.

Herein, various interior design products include a desk, a chair, a sofa, a table, a book case, a cabinet, a partition wall, etc.

When the interior design server 110 provides various interior design products as above, in S30, the user selects a desired product from the provided interior design product list by using the user terminal 100.

Subsequently, in S40, the interior design server 110 provides a simulation enabling the user to place the selected interior design products by providing a virtual space in which a real space is reflected, and in S50, the user may place the selected interior design products on the simulation provided through the user terminal 100 and finally selects a product having a desired design by placing and selecting 5 a desired form and color.

The above case will be described in below by using a partition wall as the interior design product.

The interior design server 110 generates a virtual space in association with a real space. In order to divide the virtual space, the interior design server 110 receives information for generating the virtual space in association with the real space (building name, address, area, width and height lengths, number of current lights, intensity of illumination, position, etc.), and information required for dividing the virtual space into a plurality of spaces (partition wall form, size, whether or not to install a door, number of persons to be accommodated in the virtual space, number of rooms, intensity of illumination, movement path, etc.) through the user terminal 100 by transmitting a request for the same to the user.

Subsequently, the interior design server 110 generates the virtual space in association with the real space on the basis of information received from the user terminal 100, divides the generated virtual space into the plurality of spaces, and places partition walls so that the plurality of spaces is implemented in the real space, and enables the user to select a form and color for the placed partition walls so as to select a final design.

Meanwhile, when the user selects the final design and generates an order request for a production of the interior design product using a 3D printer through the user terminal 100, in S60, the interior design server 110 generates 3D image information, internal structure information, and material information for the interior design product, and transmits the same to the 3D product output center 120.

Herein, the user orders fabrication and installation of the interior design products having the selected design by using the 3D printer by making online payment for the same.

In S70, the 3D product output center 110 fabricates the 5 partition walls by receiving 3D image information, thickness information, internal structure information, and material information of the design products from the interior design server 120 and by using the 3D printer. In addition, a delivery request thereof is transmitted to the delivery center 130.

Subsequently, in S80, the delivery center 130 performs delivery of the products to the user according to the delivery request, and uploads a delivery state to a delivery server so that the user is able to identify the delivery state.

Then, the user is provided with, by using the user terminal 100, the fabrication process from the interior design server 110 or by accessing the 3D product output center 120, and provided with the delivery process by accessing the delivery center 130.

Figure 3:
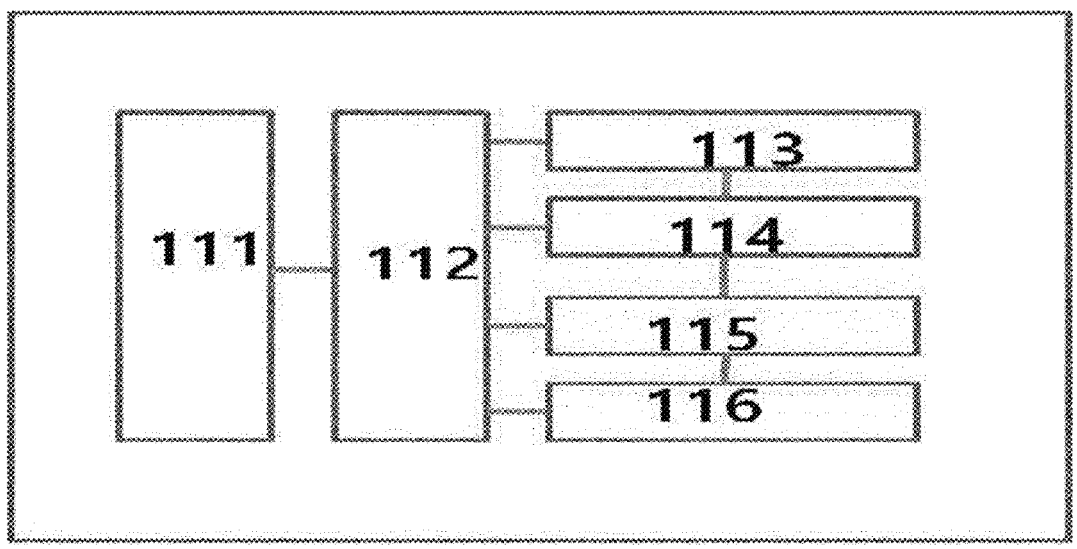
FIG. 3 is a view of a configuration showing an interior design server of FIG. 1.

In order to perform the above functions, as shown in FIG. 3, the interior design server 110 is configured with: an interface 111 performing communication with the user terminal 100 through a network; an input unit for receiving various selection signals from the user; a product providing unit 113 providing interior design products in a 2D or 3D image to the user terminal 100, and enabling the user to select the interior design product by using the user terminal 100; a simulation providing unit 114 transmitting a request for information required for generating a virtual space in which a real space is reflected to the user through the user terminal 100, providing the virtual space in which the real space is reflected by receiving the information and applying the same, providing a simulation through which the selected interior design products are placed, and enabling the user to select a desired form and color by using the above simulation so as to finally select a desired design; a data transform unit 115 generating 3D printing information including 3D image information, thickness information, internal structure information, and material information so that the interior design products according to the order are fabricated by using a 3D printer; and a transmitting unit 116 transmitting the 3D printing information 5 to the 3D product output center 110.

Figure 4:
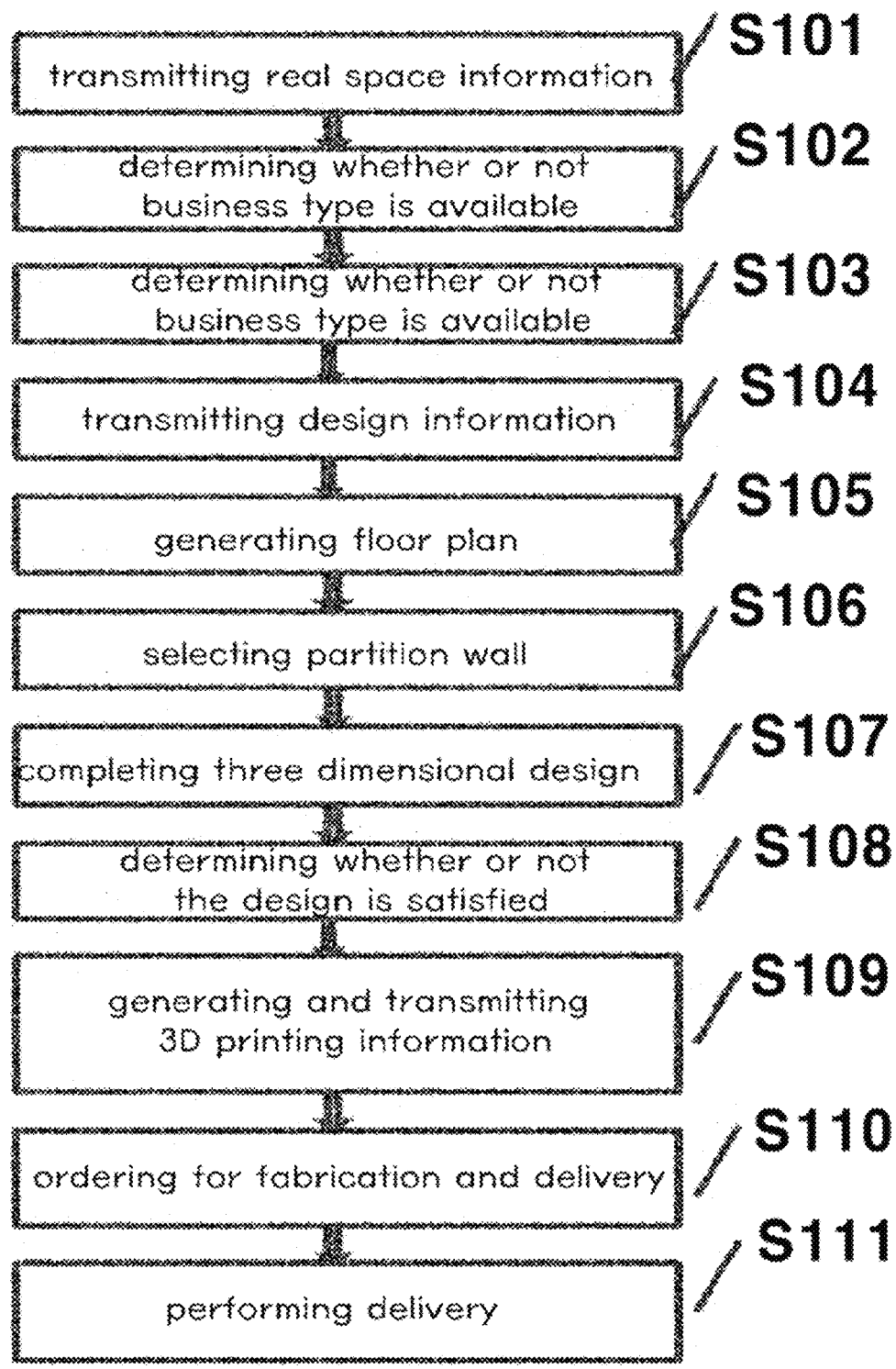
FIG. 4 is a view of a flowchart of method of fabricating an interior design product by using a 3D printer, the interior design product being a partition wall.

Meanwhile, in the interior design product fabricating method using the 3D printer according to the present invention, when a partition wall is selected by a user, the method includes, as shown in FIG. 4: S101 of transmitting real space information (building name, address, area, width and height lengths, number of current lights, intensity of illumination, position, etc.) from the user terminal 100 to the interior design server 110; S102 of determining whether the real space is a place where a business type that is desired by the user is available on the basis of the building name and address of the transmitted information; S103 of generating a corresponding virtual space on the basis of the received real space information when the real space is determined to be a place where the desired business type is available in S102;

S104 of receiving information (partition wall form, size, whether or not to install door, number of persons to be accommodated in the virtual space, number of rooms, intensity of illumination, movement path, etc.) required for dividing the virtual space generated in S103 into a plurality of spaces; S105 of generating a floor plan for dividing the virtual space into the plurality of spaces in association with information received in S101 and information received in S104; S106 of selecting a partition wall for dividing the virtual space into the plurality of spaces according to the floor plan generated in S105; S107 of completing an interior design where the virtual space is divided into the plurality of spaces and showing the same in a three-dimensional manner by applying the partition wall selected in S106; S108 of verifying whether or not the interior design of the virtual space completed in S104 is satisfied; S109 of transforming the partition wall to be placed in the real space to 3D printing information according to the result of S108, and transmitting the same to the 3D product output center 120; S110 of fabricating partition walls by using the 3D printer in the 3D product output center 120, and transmitting a delivery request to the delivery center 130; and S111 of delivering, by the delivery center 130, to the user the fabricated partition 5 walls according to the delivery request, and uploading a delivery state to a delivery server so that the user is able to identify the delivery state.

S101, S103 to S108 are steps performed by communication between the user terminal 100 and the interior design server 110 through a network, S102 is a step performed by network communication between the interior design server 110 and an available business type checking site, for example, between sites in association with the education office and the district office when the business type is to run an education business, S109 is a step performed by network communication between the interior design server 110 and the 3D product output center 120 according to a request of the user terminal 100, S110 is a step performed between the 3D product output center 120 and the delivery center 130, and S111 is a step performed between the delivery center 130 and the user or user terminal.

Hereinafter, the overall operation of the present invention will be described in more detail by dividing or integrating the same into or in stages.

1. Generating Virtual Space

Figure 5:
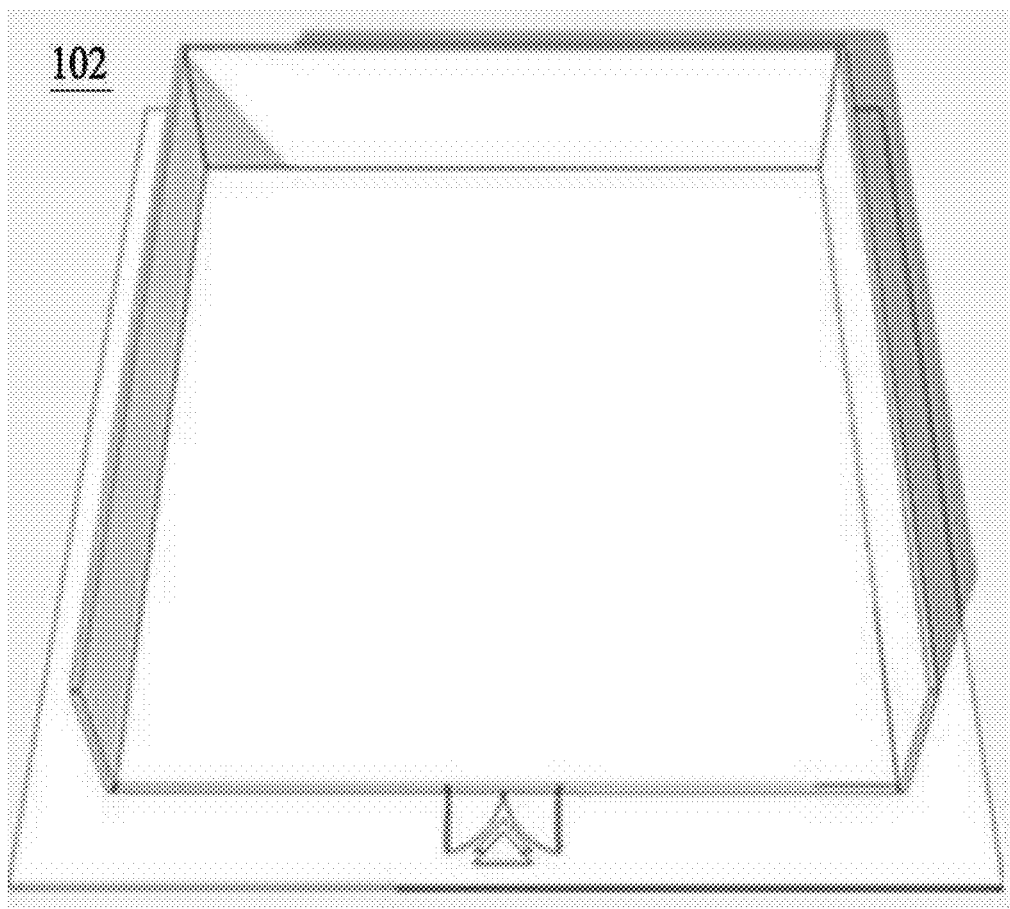
FIG. 5 is a view of an example showing a virtual space where a virtual space is divided by using a partition wall according to the present invention.

Under a state where the user terminal 100 and the interior design server 110 are connected through a network, when information of a real space is transmitted from the user terminal 100 to the interior design server 110, the interior design server 110 generates a virtual space 102 in association with the real space on the basis of the received information as shown in FIG. 5.

The real space refers to an internal space where the user wants to perform interior design. The virtual space is a space generated online by the interior design server 110, and is a space where the real space is minimized in size, area, and form by a predetermined ratio.

Accordingly, sizes of partition walls and other components which will be placed on the virtual space are downsized by the same ratio of the virtual 5 space and displayed online.

Information of the real space for generating the virtual space 102 may include horizontal and vertical lengths, a ceiling length, interior design construction budget, etc.

In other words, the user may consider what kind of interior design form is required for the real space, and store and manages a list for desired interior design construction, information of interior design construction estimation budget, etc. in the interior design server 110. Herein, when the user wants to perform interior design of a study room of a private education institute, whether or not authentication or improvement of the corresponding building as a private education institute is available has to be checked, and such type of information is provided from a server in association with the education office which is linked to the interior design server 110.

The interior design server 110 generates the virtual space 102 as shown in FIG. 5, and transmits the same to the user terminal 100 so as to be stored and managed.

Meanwhile, when the real space is not a rectangle, the interior design server 110 enables the user to select a form of the virtual space that corresponds to the real space.

2. Generating Floor Plan

The real space may be a space where various types of businesses run. In other words, the real space may be a general office, a shop displaying merchandise, a café for drinking beverages, and a private education institute providing a learning space. The present invention will be described by finding application in a private education institute.

A person who wants to run a private education institute searches a building suitable for the institute and measures the dimensions of a real space (horizontal and vertical lengths, ceiling height, etc.), and transmits the same to the interior design server 110 by using the user terminal 100. Accordingly, the interior design server 110 checks whether or not the corresponding building is available for running a private education institute by using a linked site on the basis of information (building address, building name, etc.) received from the user terminal 100.

Figure 6:
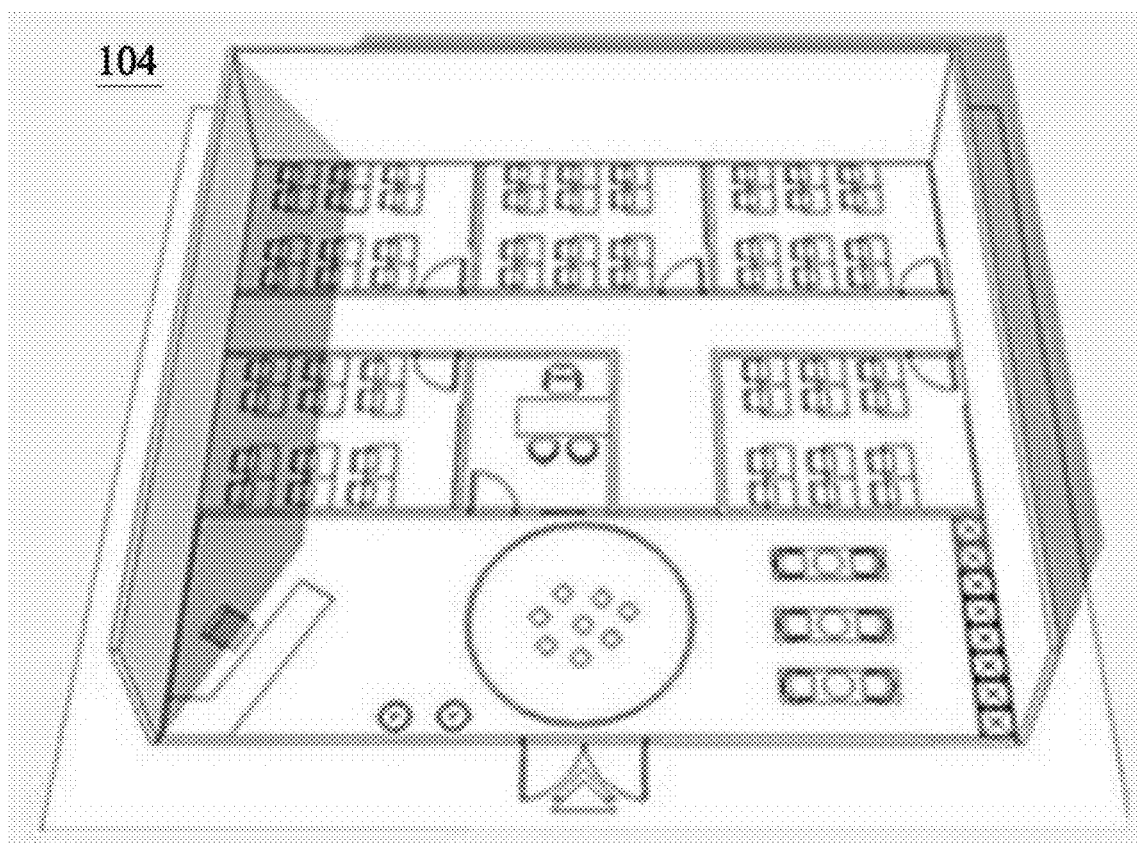
FIG. 6 is a plan view of a virtual space where a virtual space is divided by using a partition wall according to the present invention.

When running a private education institute is permissible, the interior design server 110 generates a floor plan 104 as shown in FIG. 6 for generating a suitable layout on the basis of various types of information (lights, windows, entrance, information desk, partition walls, number of persons to be accommodated in the virtual space, number of rooms, etc.) received from the user terminal 100.

Figure 7:
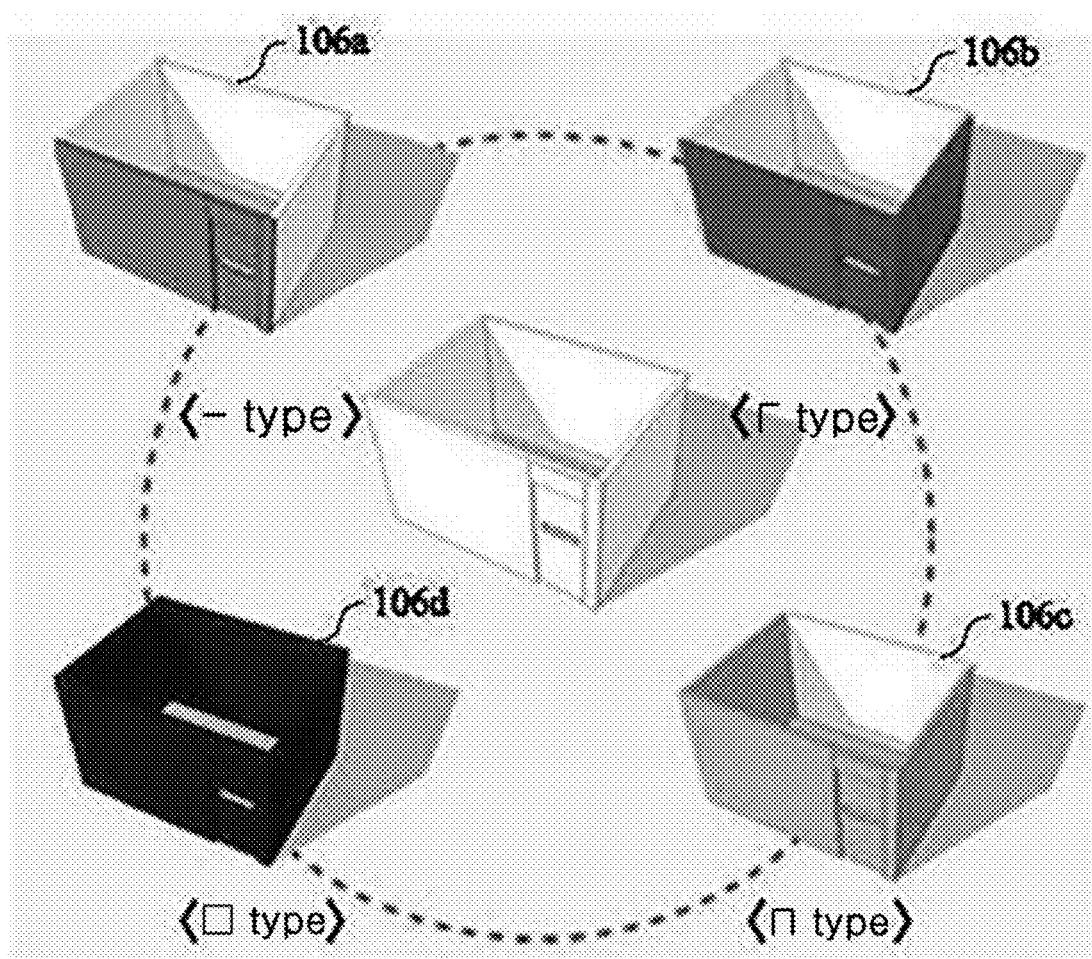
FIG. 7 is a view showing various examples of a partition wall used for dividing a virtual space wall according to the present invention.

Herein, generating the floor plan 104 is performed on the basis of various forms of partition walls as shown in FIG. 7, the partition walls may be or may not be configured with a door. Selecting a partition wall with a door or without a door may be determined by referencing an area (size) of the virtual space, a number of persons to be accommodated therein and a number of rooms, a desk layout, a movement path, etc.

In addition, depending on a number of lights installed in the ceiling or wall and positions thereof, it is ensured that no dark spots occur by being out of illumination range of the lights. For example, when a floor plan is generated such that an arbitrary light is positioned between partition walls forming spaces different from each other, problem occurs in that intensity of illumination of the light emitting light to a space sub-divided by the partition wall becomes low, thus causing discomfort to learners while intensity of illumination between partition walls becomes unnecessarily high. Designing is performed to prevent such a problem. However, natural light that is reflected in the room from a window of a space where the window is open functions as a light having a certain intensity of illumination, and thus, according to the same, it is preferable to design such that light with uniform intensity of illumination is provided to spaces divided by partition walls. Herein, since intensity of illumination of natural light varies depending on the weather, such as sunny, cloudy, rainy, it is preferable to design in consideration of all of the same. However, designing may be performed by simply considering the position and size of the window.

In addition, rather than referencing a position and a number of lights of the real space transmitted from the user terminal 100 to the interior design server 110, the present invention performs dividing into a plurality of spaces by using partition walls, and additionally transmits information of a position and a number of lights in accordance of the plurality of spaces to the user terminal 100 so that the user may change and install a number and a position of lights on the basis of the above information when performing real space interior designing.

In addition, generating a floor plan of the present invention is performed in consideration of a number of desks placed in each space (in association with a number of persons to be accommodated), a position of a desk of a teacher who will give lesson in that space, and a movement path of students. For example, assuming that 12 desks are arranged in two columns where partition walls are installed, the best suitable movement path is generated by considering whether or not a movement path of students of the left column desks to be a path between the right column desks or to be a path between a left sided partition wall. Further consideration may include an open and closing structure of the window (sliding type or hinged type), determining an interval (width) of the movement path, determining a position of a door to be installed of the space subdivided by the partition wall, etc. For example, it is preferable to design the width of the movement path between spaces to be 1 meter, to design a width of a door to vary when the doors of the spaces are formed to face from each other so that collision between the doors are prevented when the doors are open at the same time, and to design the positions of the doors of the spaces to alternate so that the doors are not opened at the same positions.

In addition, designing is performed such that the best effective movement path between spaces subdivided by the partition wall is ensured, that is a movement path distance when leaving the spaces and going outside of the real space through the main door is ensured.

As described above, the interior design server 110 generates the floor plan 104 as shown in FIG. 6 by dividing the same into a classroom, a corridor, and an information desk, etc. in consideration of all of the above factors.

The user may verify the floor plan 104 provided from the interior design server 110, and variably change a position, a size, and a form of the classroom, the corridor, and the information desk.

A virtual space design as described above may represent a size at which partition walls are installed so as to be applied to the real space, and represent in a size, a form, and a position of a lecture desk and student desks which are placed within the space subdivided by the partition wall.

3. Selecting Partition Wall

When information of partition walls that will be placed in the floor plan is received in the interior design server 110 from the user terminal 100, the interior design server 110 places the partition walls in a virtual space according to the received information.

In other words, as shown in FIG. 6, when a floor plan is generated, the interior design server 110 selects a suitable partition wall among various types of partition walls 106a to 106d as shown in FIG. 7.

As shown in FIG. 7, the partition wall may be formed in at least one of a "− type" partition wall 106a formed with a front surface including a door, 5 a "T type" partition wall 106b formed with a front surface and a first lateral surface in connection to the front surface, a "Π type" partition wall 106c formed with a front surface and first and second lateral surfaces in connection to the front surface, and a "☐ type" partition wall 106d formed with a front surface, first and second lateral surfaces in connection to the front surface, and a rear surface facing the front surface. In addition, provision of the partition wall in various forms is available according to a form of the classroom and the corridor.

4. Design Completion

Figure 8:
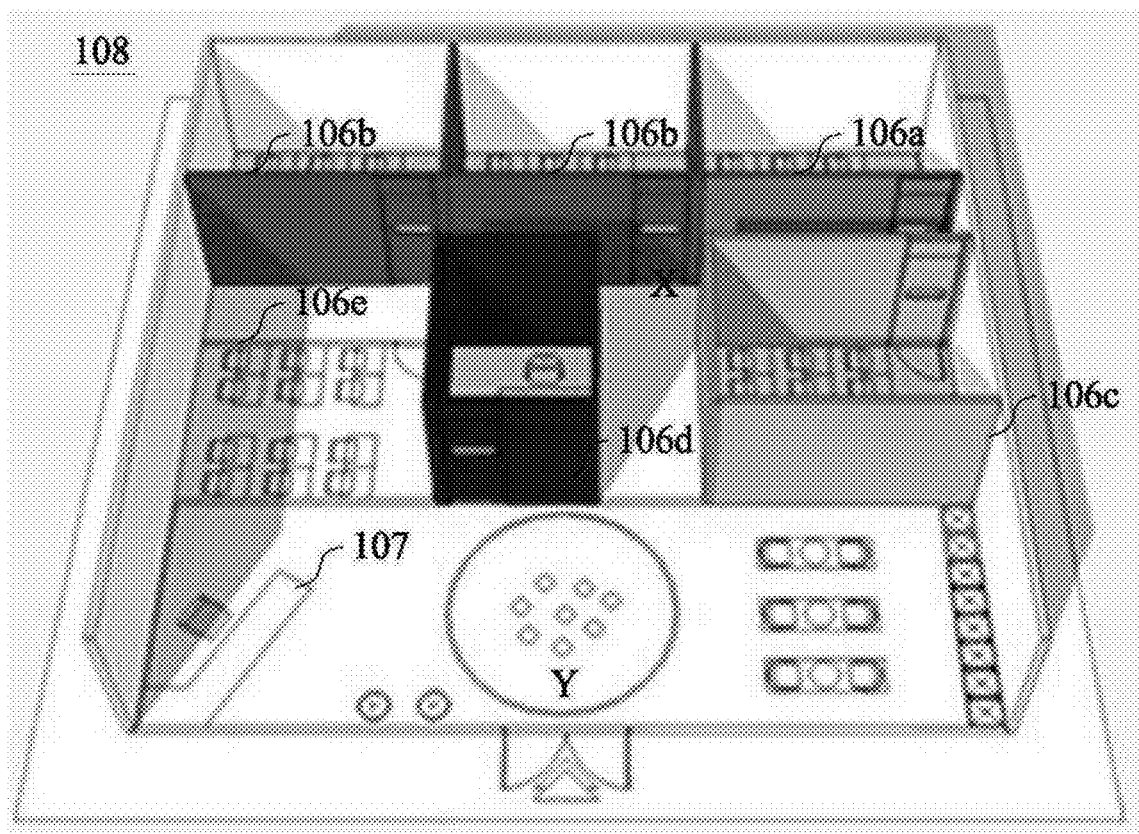
FIG. 8 is a view of an example where a virtual space is divided by using a partition wall according to the present invention.

The interior design server 110 provides a virtual space design 108 where partition walls 106a to 106d are placed in a virtual space 102 as shown in FIG. 8 by using the generated floor plan and the partition wall information transmitted from the user terminal 100. In FIG. 8, an example of an interior space design 108 is shown which is configured with one "− type" partition wall 106a, two "T type" partition walls 106b, one "Π type" partition wall 106c, one "☐ type" partition wall 106d, and one information desk 107.

The partition walls may be classified into various types according to a form thereof as described above, but may be classified into various types according to a position of a door. In other words, the "Π type" partition wall 106c, in FIG. 7, a door is formed in a surface corresponding to a front surface, but in FIG. 8, a door is formed in a surface corresponding to a lateral surface. Accordingly, the user has to transmit information of the door to the interior design server 110 in addition to the form of the partition wall. However, as shown in FIGS. 5 to 8, the interior design server 110 provides various images, and thus the user may correct an error by directly checking the images, and the virtual space design 108 may be finally generated as shown in FIG. 8.

Meanwhile, in FIG. 8, in addition to the partition wall types shown in FIG. 7, a partition wall of a form 106e formed with a front surface 5 and a rear surface has to be used. In other word, as described above, forms of the partition wall may be variably fabricated in various forms in addition to the forms shown in FIG. 7. In FIG. 8, a "∥ type" partition wall 106e formed with front and rear surfaces has to be placed to the left of the "☐ type" partition wall 106d.

Figure 12:
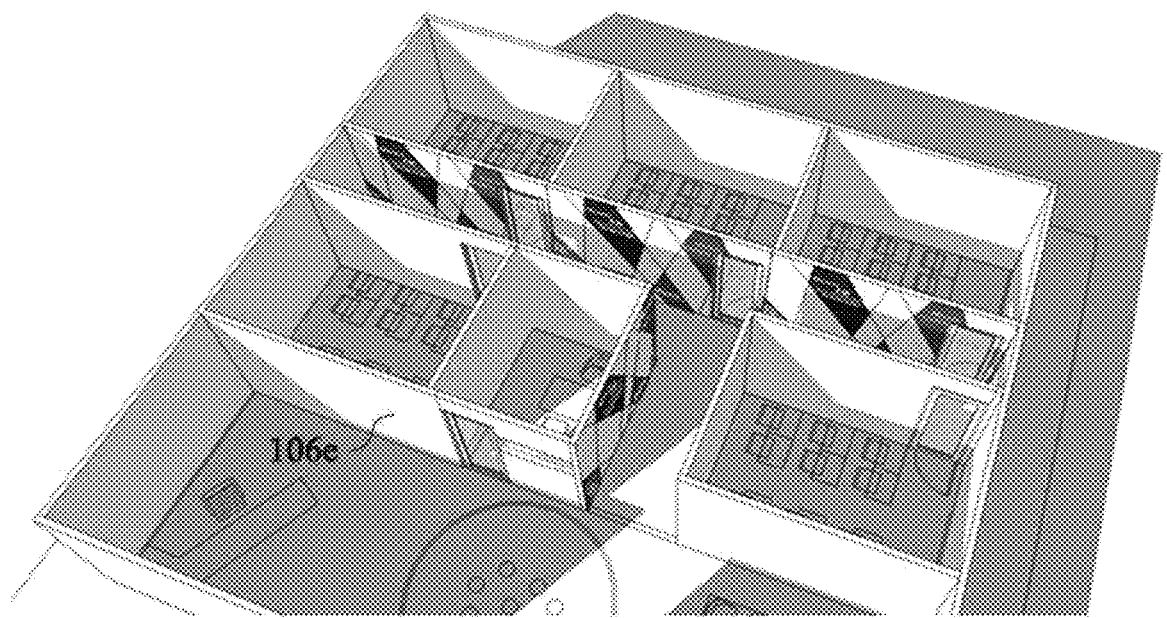

A final virtual space design 108 in which a partition wall of "∥ type" partition wall 106e is placed is shown in FIG. 12.

Figure 10:
FIGS. 10 to 12 are views of an example showing a three-dimensional image of a virtual space for performing division of a space by using a partition wall according to the present invention.
Figure 11:
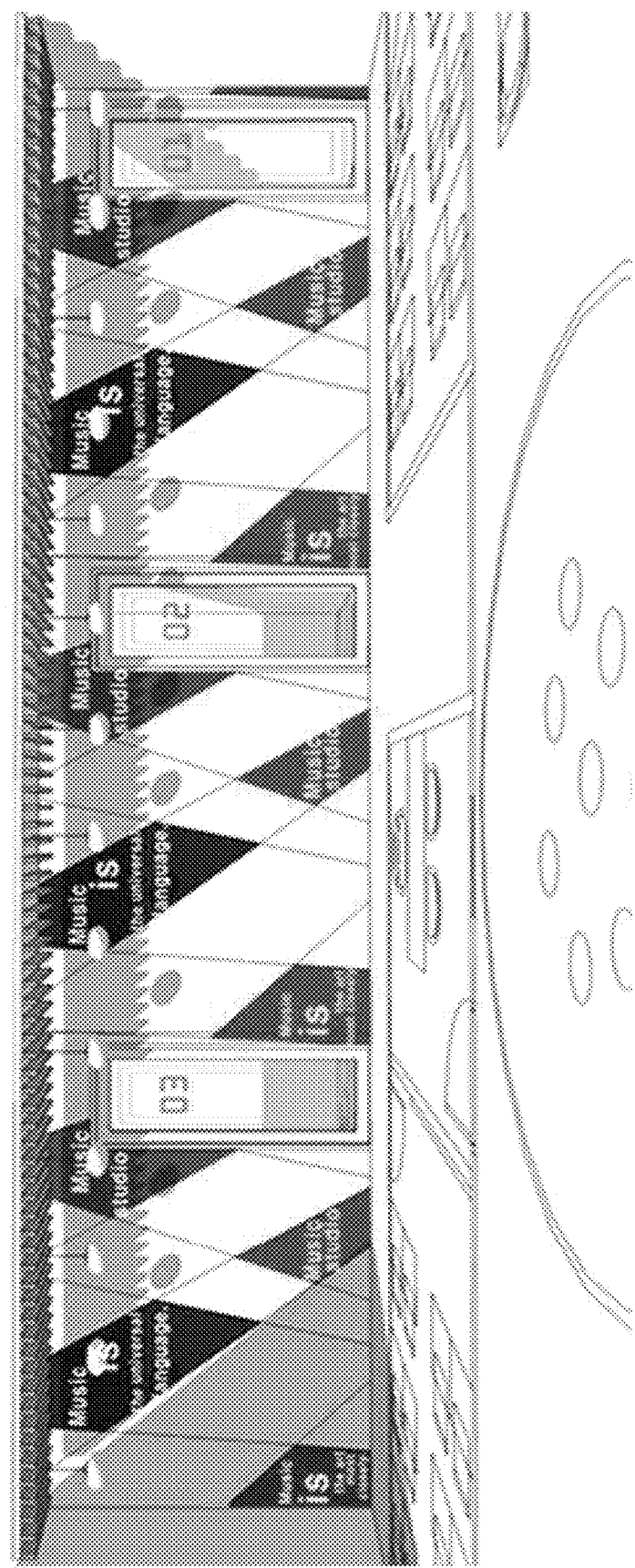

The interior design server 110 may provide the virtual space design where the partition walls are placed in a form of 3D image as shown in FIGS. 10 to 12.

When the virtual space design is generated, the interior design server 110 may 15 provide a figure of a corridor formed by the partition walls in a 3D manner as shown in FIG. 10 by using the generated virtual space design. Such a 3D image may be provided in various view positions according to a selection of the user.

For example, when the user requests for an X position view of the virtual space design 108 shown in FIG. 8, the interior design server 110 may provide a 3D view at an X position as shown in FIG. 10.

In addition, when the user requests for a Y position view of the virtual space design 108 shown in FIG. 8, the interior design server 110 may provide a 3D view at a Y position as shown in FIG. 10.

In addition, images shown in FIGS. 10 and 11 may be provided before the virtual space design 108 is completed. In other words, a 3D image shown in FIG. 11 is a 3D image before the partition wall of "☐ type" 106d and the partition wall of "‖ type" 106e are formed.

Accordingly, the user may be provided with images identical 5 to directly checking with his or her own eyes in the real space, and may directly perform designing as he or she wants.

Figure 9:
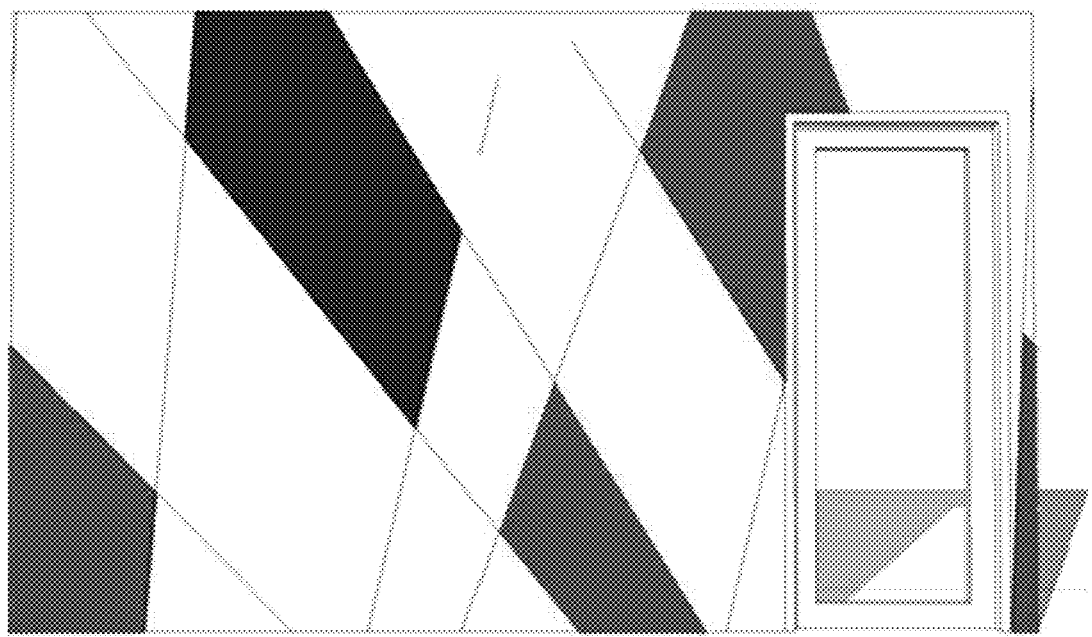
FIG. 9 is a view of an example where a virtual space is divided by using a partition wall of FIG. 7.

Meanwhile, the partition walls 106a to 106e may be provided in a form as shown in FIG. 9. In a virtual partition wall shown in FIG. 9, a door is installed, but a partition wall without a door may be provided. In addition, the partition wall may be provided in a form identical to the partition wall installed in the real space.

In other words, the interior design server 110 provides a virtual space design by using a virtual partition wall having a form identical to the partition wall applied to the real interior design construction, and thus the form of the virtual space design and the form of the real interior space that will be finally completed by interior design construction become the same.

5. Ordering Partition Wall

When the virtual space design shown in FIG. 8, and FIGS. 10 to 12 is completed, the user places an order for the partition walls to the interior design server 110 by using the user terminal 100.

Herein, the interior design server 110 may transmit to the user terminal 100 a cost for fabricating the partition walls by using the 3D printer, a cost for installing the partition walls, and a construction period for installing the partition walls. Accordingly, the user may place an order for the partition walls after checking the above information.

Meanwhile, when performing interior design construction for installing the partition walls in the interior space, in addition to installation of the partition walls, various interior decorations, for example, finishing material of the partition walls, and additional interior design parts such as lamp as shown in FIGS. 10 and 11 may be required. Accordingly, the user may select parts required in addition to the partition walls, 5 according to a menu provided by the interior design server 110.

6. Generating 3D Printing Information

When an order for the partition walls which requests installation the partition walls corresponding to the virtual partition walls in the real space by using the virtual space design is received from the user terminal 100, the interior design server 110 transforms the partition walls according to the order to 3D printing information so as to be fabricated by using the 3D printer, and transmits the same to the 3D product output center 130.

Figure 13:
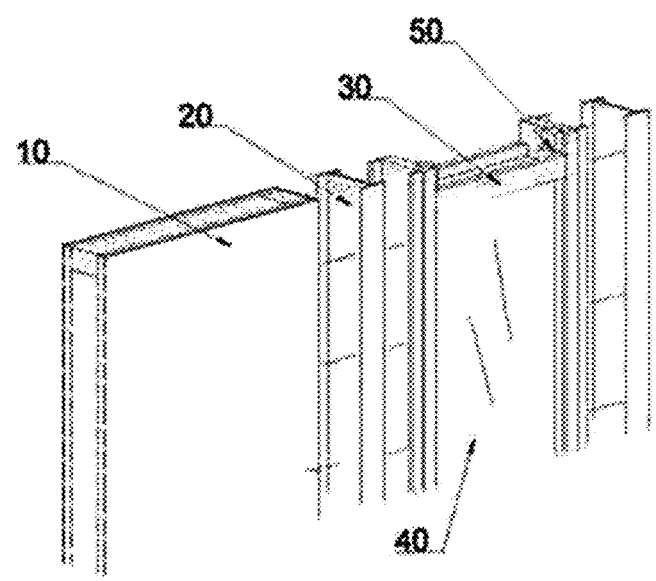
FIG. 13 is a view of an example of assembling a partition wall.
Figure 14:
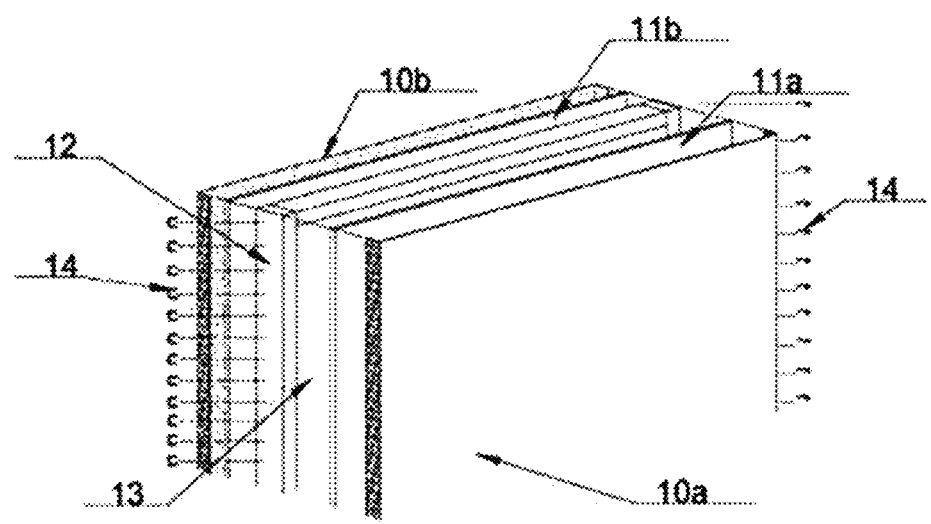
FIG. 14 is an exploded view of the partition wall of FIG. 13.

FIG. 13 is a view of an assembling example of the partition wall. FIG. 14 is a deployed view of the partition wall.

As shown in the figure, the partition wall may include a panel 10, an H-bar 20, a glass partition 30, a glass 40, an upper finishing frame 50, surface fabrics 10a and 10b, gypsum boards 11a and 11b, a sheet material 12, a sound-absorbing thermal insulating material 13, and fabric fixing brad nails 14.

In order to fabricate the above partition wall by using the 3D printer, thickness has to be assigned to 3D images of partition walls that are generated by the interior design server 110. This is because, as described above, the practical partition walls have thickness, but the 3D image formed by the interior design server 110 does not include thickness information.

Accordingly, the interior design server 110 generates thickness information for assigning thickness to each partition wall by using the data transform unit 115.

In addition, as described above, the panel 10 may be filled with the sound-absorbing thermal insulating material 13, and for the same, internal structure information is added.

In addition, as described above, materials of the panel 10, the H-bar 20, the glass partition 30, the glass 40, the upper finishing frame 50, the surface fabrics 10a and 10b, the gypsum boards 11a and 11b, the sheet material 12, the sound-absorbing 5 thermal insulating material 13, and the fabric fixing brad nails are different.

Accordingly, for the same, the interior design server 110 defines the material for each component.

As above, the interior design server 110 generates thickness information that assigns thickness to the 3D image information, generates internal information of the interior of the partition wall, and generates material information of each component, and transmits the same to the 3D product output center 130 by using the transmitting unit 116.

7. Fabrication and Delivery of Each Partition Wall

In the 3D product output center 120, the partition walls are fabricated by using the 3D printer, and a delivery request thereof is transmitted to the delivery center 130.

In addition, the delivery center 130 delivers the fabricated partition walls to the user according to a delivery request, and uploads a delivery state to a delivery server so that the user may identify the delivery state.

8. Performing Construction

A period for interior design construction is finally determined as information of the fabrication period of the partition walls, and construction start and end dates, etc. is transmitted to the user terminal 100 through a communication method such as phone call or e-mail according to the user places an order of the partition walls.

Accordingly, the constructor fabricates the partition walls and performs interior design construction of placing the partition walls in the real space.

According to the present invention described above, recently, fabricating various products using 3D printing is attracting much attention, an 5 d by using the same, satisfying user need and saving time and money is possible.

A skilled person in the art to which the present invention pertains will be able to understand that the present invention may be embodied in other specific forms without modifying the technical concepts or essential characteristics of the present invention. In this regard, the exemplary embodiments disclosed herein are only for illustrative purposes and should not be construed as limiting the scope of the present invention. On the contrary, the present invention is intended to cover not only the exemplary embodiments but also various alternatives, modifications, equivalents, and other embodiments that may be included within the spirit and scope of the present invention as defined by the appended claims.

Hereinafter, as another embodiment of the present invention, an operation of enabling the user to feel tactile sensations for products included in a simulation image will be described.

Referring to the interior design product fabricating system of FIG. 1 for convenience of description, the interior design product fabricating system of FIG. 1 according to another embodiment of the present invention first performs (or performs in advance) an operation of generating haptic data (or tactile data) for products (e.g., a partition wall, a sofa, a table, etc.) used for the interior simulation.

The generated haptic data is matched with the corresponding products and stored in an interior design server 110 or stored in a separate database (DB) operating in conjunction with the interior design server 110. For example, the product that is a partition wall is formed of various materials. Further, haptic data a is generated for a product A and matched therewith, and haptic data b is generated for a product B and matched therewith.

Accordingly, when the user selects a specific product from the simulation image displayed on a screen of a user terminal 100, more specifically, when the user wants to feel a tactile sensation of the selected product, the interior design server 110 receives relevant information (e.g., information sensed by a sensor) from the user terminal 100, and on the basis of the corresponding information, the interior design server 110 provides the previously stored haptic data, which is matched with the corresponding information, to the user to allow the user to feel the tactile sensation.

For example, the user terminal 100, such as a smartphone or a tablet PC, includes a touch panel. That is, the touch panel includes a plurality of sensors to sense a touch operation of the user. Thus, when the user touches (e.g., drags the screen) a specific product in the simulation image, the interior design server 110 determines the corresponding operation through a sensing signal of the sensor and provides haptic data for the product, for which the user wants to feel a tactile sensation, to the user terminal 100 to allow the user to feel the tactile sensation. The interior design server 110 has already obtained position information displayed on the screen of the user terminal 100 for the products when providing the simulation image, and thus it is not difficult for the interior design server 110 to obtain information on which product is selected on the basis of the sensing position of the product selected by the user.

In addition, in addition to the above-described touch operation, in other embodiments of the present invention, when the user touches a specific product of the simulation image, the interior design server 110 may sense this and display a pop-up window on the screen asking whether the user wants to feel a tactile sensation of the product, and provide haptic data to the user as described above when the user responds to this so that the user may feel the tactile sensation of the specific product. Meanwhile, the user terminal 100 may have various interface operations to feel a tactile sensation, and thus, in the embodiments of the present invention, the interface operation will not be particularly limited to any one form. For example, the user may issue a voice command, and the user terminal 100 may receive the corresponding issued voice command through a microphone thereof, and based on this, related haptic data may be provided.

The interior design product fabricating system according to another embodiment of the present invention implements a haptic technology to allow the user to feel a tactile sensation. The term "haptic" refers to a computer tactile technology and allows the user to feel a sense of touch, power, movement, etc. through user's input devices such as a keyboard, a mouse, a joystick, a touch screen, etc. among computer functions. Accordingly, in the embodiment of the present invention, when the user terminal 100 is a device such as a tablet PC or a smart phone, the haptic technology may be implemented by configuring a vibration motor, etc. for performing a tactile operation in an image panel or a touch panel. In addition, in a case of a computer such as a desktop computer or a laptop computer, the tactile technology may be implemented by configuring a vibration motor in a mouse or a mouse pad. Of course, in order to implement the tactile technology, the user terminal 100 of FIG. 1 may use a dedicated device manufactured separately from a mouse, etc. and thus, in the embodiments of the present invention, it will not be particularly limited to any one form.

The core of the haptic technology is vibration. The vibration may create various types of tactile sensations while changing an amplitude, a frequency, a transmission time, etc., and a technology for delivering a virtual tactile sensation by applying this stimulus to the skin of a person is a haptic interface. Thus, a touch panel of a smartphone is pressed, a small-sized vibration motor provided below the touch panel is operated, and here, a tactile sensation of the generated vibration is transmitted to the user through the skin of a finger that presses a specific product. The interior design server 110 of FIG. 1 generates haptic data related to a tactile sensation type of the product in consideration of the amplitude, the frequency, the transmission time, etc. related to the vibration, and then provides the generated haptic data.

Of course, in other embodiments of the present invention, various technologies may be applied in addition to the vibration, which is the principle of the haptic technology. The representative technology thereof is a technology that causes the user to feel as if a display surface is smooth or moist, and a technology that gives the user a dynamic feeling as if the display surface is alive is also possible. To this end, in addition to the vibration motor, the user terminal 100 may further include various components for implementing the above technologies.

The haptic interface may be largely divided into two interfaces. These are a kinesthetic interface that allows muscles to sense a weight, a shape, stiffness, etc. and a tactile interface that allows the skin to feel a surface pattern, texture, temperature, etc. The kinesthetic haptic interface is a haptic interface that expresses a force acting between a human being and an object, and may be divided into series/parallel types, desktop/portable/wearable types, etc. depending on the form and a force transmission structure thereof. In the case of the series type, a magnitude of the force that may be expressed is relatively small as compared with the parallel type, but the series type has an advantage of having a wide range of motion. Specifically, the kinesthetic haptic interface is classified into various types according to an actuator etc. On the other hand, the tactile interface transmits a virtual feeling by applying a stimulus to human skin with a small-sized and efficient component, such as a vibration motor. Most tactile interfaces may be produced and used as a unidirectional haptic display that does not provide feedback of position information, and haptic interfaces that provide temperature information in addition to texture are also possible. Accordingly, in the embodiment of the present invention, any technology may be implemented as long as the user can feel a tactile sensation in relation to a product in the simulation image.

Figure 15:
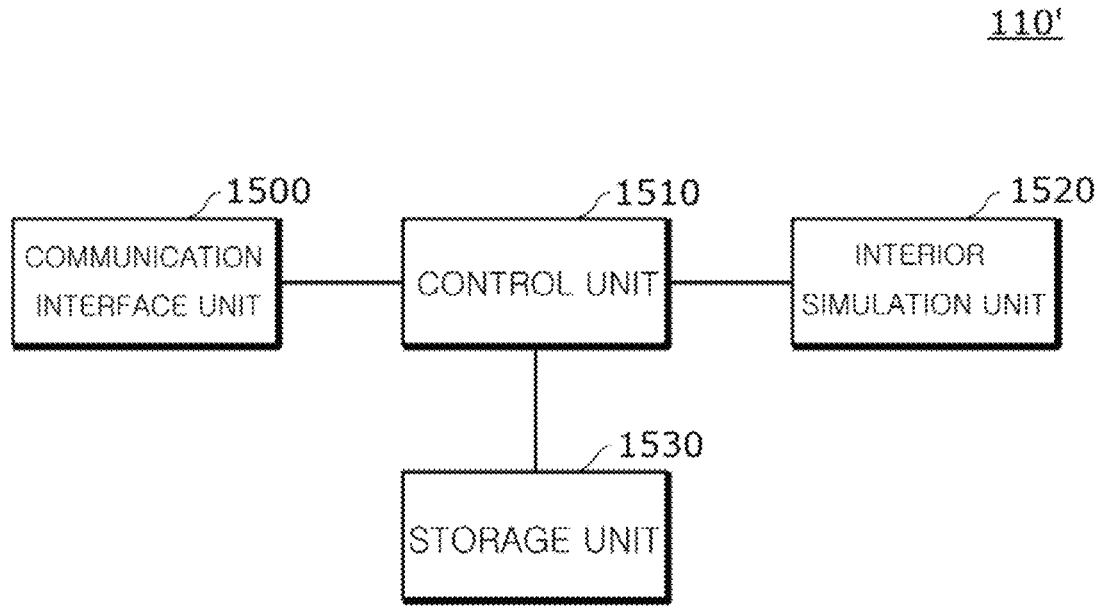
FIG. 15 is a block diagram illustrating another detailed structure of the interior design server of FIG. 1.

FIG. 15 is a block diagram showing another detailed structure of the interior design server of FIG. 1.

As shown in FIG. 15, an interior design server (or interior service apparatus) 110' of FIG. 1 according to another embodiment of the present invention includes some or all of a communication interface unit 1500, a control unit 1510, an interior simulation unit 1520, and a storage unit 1530.

Here, the phrase "including some or all" refers to a case in which the interior design server 110' is configured by omitting some components such as the storage unit 1530, a case in which the interior design server 110' is configured by integrating some components such as the interior simulation unit 1520 with other components such as the control unit 1510, etc., and in order to help the full understanding of the invention, the description is made by taking the case in which all the components are included.

The communication interface unit 1500 communicates with each of the user terminal 100, the 3D product output center 120, and the delivery center 130 of FIG. 1 via a communication network (e.g., a wired/wireless Internet network, etc.). When there is an interior simulation service request according to the embodiment of the present invention to the user terminal 100, the communication interface unit 1500 performs operations for providing a service for the request. The communication interface unit 1500 may perform operations such as modulation/demodulation, muxing/demuxing, encoding/decoding, etc. in the process of performing communication with the user terminal 100, which are obvious to those skilled in the art and thus a further description thereof will be omitted.

Depending on what type of terminal the user terminal 100 is, the communication interface unit 1500 may operate in various forms. For example, in a case in which a haptic technology is implemented, when the user wants to feel a tactile sensation of a specific product in a simulation image and there is a request from a tablet PC, etc., the interface unit 1500 operates such that the user may feel the tactile sensation of the selected product through a sensor and a small-sized vibration motor that are positioned below the specific product. Of course, the communication interface unit 1500 may transmit the corresponding haptic data to the tablet PC under the control of the control unit 1510.

On the other hand, in a case of another user using the user terminal 100, for example, when the user wants to feel a tactile sensation for a specific product in the simulation image through a mouse and a mouse pad of a computer, any specific product on the screen that the user selects or wants to select through the mouse is sensed (e.g., the movement of the mouse is sensed), and based on this, haptic data that is matched with the corresponding product and stored in advance may be transmitted to the mouse pad under the control of the control unit 1510. Of course, the mouse pad according to another embodiment of the present invention may include a vibration motor or a communication unit (e.g., a communication module) for receiving haptic data to implement a haptic technology. Of course, the implementation of the haptic technology may also be achieved by configuring a vibration motor, etc. in a click button of the mouse in addition to the mouse pad.

Further, when a user's final confirmation is made through the interior simulation image, the communication interface unit 1500 transmits 3D printing information for the products applied to the simulation to the 3D product output center 120, and when a notification that the fabrication of a product has been completed is received from the 3D product output center 120, the communication interface unit 1500 requests the delivery of the product to the delivery center 130. The communication interface unit 1500 may be involved in such operations.

The control unit 1510 is responsible for the overall control operations of the communication interface unit 1500, the interior simulation unit 1520, and the storage unit 1530, which constitute the interior design server 110' of FIG. 15. When the interior simulation service request is received from the user terminal 100 of FIG. 1, the control unit 1510 may control the interior simulation unit 1520 to provide a simulation service screen to the user terminal 100. In addition, when the user provides interior information on a form, in which the user intends to construct an arbitrary space in which he or she intends to actually perform the interior, that is, information necessary to divide the arbitrary space into a plurality of small spaces, through the user terminal 100, a simulation image may be provided by performing optimal space division on the basis of the corresponding information. Here, the phrase "optimal space division" may be defined as a space division that satisfies all user-required conditions even though the arbitrary space may be divided into various forms. In other words, since various forms of the space division are possible, a space division form of a candidate group may be provided to the user, and a space division form selected by the user from among the candidate group may become the optimal space division.

For example, the interior information provided by the user, that is, a required condition may include the number of small spaces to be divided, whether or not to install a door, an intensity of illumination, etc. as described above. When the control unit 1510 provides necessary information such as the required condition to the interior simulation unit 1520, the interior simulation unit 1520 generates a simulation image in which the necessary information is reflected and provides the simulation image to the control unit 1510. Further, the control unit 1510 may control the communication interface unit 1500 to provide the simulation image to the user terminal 100.

Furthermore, the control unit 1510 is also involved in a tactile operation requested by the user of the user terminal 100. Although all operations related to such a haptic operation are substantially performed by the interior simulation unit 1520, the control unit 1510 may process various operations in connection with the interior simulation unit 1520.

The interior simulation unit 1520 produces or services a simulation image that is implemented in a virtual space by reflecting the user's required condition before construction is made for the arbitrary space in which the user intends to perform the actual interior construction. Of course, to this end, when a drawing is secured on the basis of building information (e.g., a building name, an address, etc.) provided by the user, or there is a drawing provided by the user, a virtual 3D simulation space is created using the drawing. The contents related to this have been sufficiently described above, and thus the contents may be used instead. For example, the interior simulation unit 1520 may be understood as a configuration including the product providing unit 113, the simulation providing unit 114, the data transform unit 115, etc. of FIG. 3.

Above all, when the user wants to feel a tactile sensation of a specific product in the state in which the interior simulation image according to the user's required condition is provided to the user terminal 100, the interior simulation unit 1520 determines which specific product is selected from the simulation image previously provided to the user. Since the user terminal 100 includes the touch panel composed of a plurality of sensors, the user terminal 100 may confirm which product is selected on the basis of sensing information (e.g., coordinate values on the touch panel screen, etc.) of the specific product selected by the user. Accordingly, the interior simulation unit 1520 extracts previously produced haptic data related to the corresponding product and provides the extracted haptic data to the user terminal 100.

Although the haptic data is produced in the form of binary bits, data of the corresponding binary bits includes various pieces of information about how to operate the vibration motor so that the user will feel a tactile sensation. In other words, information on the intensity, speed, and length of the operation of the corresponding vibration motor is included. The intensity is related to an amplitude of a (control) signal, and the speed is related to a frequency of the signal. In addition, the length may be related to a period T of the signal. Accordingly, the tactile sensation of the product due to the vibration, that is, haptic data may be produced by changing the plurality of variables into various forms.

Meanwhile, the interior simulation unit 1520 according to another embodiment of the present invention may further perform operations such as artificial intelligence deep learning in addition to the haptic operation. The artificial intelligence may be distinguished from a conventional rule-based operation that provides a user with a simulation image in a space division form. In other words, since the division form that may be provided when all the user's required conditions are satisfied or when more than a reference value is satisfied is specified in the rule-based operation, outside of this, there is no space division form that may be provided to the user. On the other hand, in the case in which the artificial intelligence is used, when the user does not have a space division form, such as satisfying all the required conditions, a similar condition, or a space division form related to the interior construction of another user of the same type of industry may be recommended to the user. As described above, the interior simulation unit 1520 may identify the preference of customers, that is, users, and continuously learn such data so that even when a rule, that is, a policy designated at the time of program design is not satisfied, a result in the space division form may be provided.

For example, when the interior design server 110 of FIG. 1 operates in conjunction with an external server such as an Internet portal server, the interior simulation unit 1520 may determine an interior form (or trend) preferred by recent users from the external server. Such data may be collected through various paths, and such data may be analyzed to identify interior trends such as residential, commercial, and educational spaces by era (or period). For example, when there is data to prove that the color of lighting increases a learning effect, this trend may be reflected. Accordingly, when a change in the interior trend is confirmed through an artificial intelligence program, the interior simulation unit 1520 may produce a simulation image, which is provided to the user, in consideration of the change and provide the simulation image to the user. Accordingly, even when the user presents the same interior condition, the provided simulation image may be different according to the change in time (or era), in other words, according to the user's preferred interior trend.

The storage unit 1530 may temporarily store various pieces of data processed under the control of the control unit 1510. The storage unit 1530 may include various types of memory such as a read only memory (ROM), a random-access memory (RAM), and a hard disk drive (HDD), and may include a registry of software, etc. The control unit 1510 may receive data such as an interior requirement, etc. of a user, which is received through the communication interface unit 1500, temporarily store the data in the storage unit 1530, and then retrieve the stored data and provide it to the interior simulation unit 1520.

In addition to the above description, the communication interface unit 1500, the control unit 1510, the interior simulation unit 1520, and the storage unit 1530 of FIG. 15 may perform various operations, and since the other details have been sufficiently described above, contents thereof will be replaced with the contents sufficiently described above.

Meanwhile, although the communication interface unit 1500, the control unit 1510, the interior simulation unit 1520, and the storage unit 1530 according to the embodiment of the present invention are composed of hardware modules physically separated from each other, each module may store software for performing the above operations therein and execute it. However, the corresponding software may be a set of software modules, and each module may be implemented as hardware, and thus, a configuration is not be particularly limited to software or hardware. For example, the storage unit 1530 may be a storage or a memory, which is hardware. However, it is also very possible for information to be stored in a form of software (repository), and thus, the present invention is not particularly limited to the above contents.

Meanwhile, as still another embodiment of the present invention, the control unit 1510 may include a central processing unit (CPU) and a memory, which may be formed by one chip. The CPU includes a control circuit, an arithmetic logic unit (ALU), an instruction interpreter, a registry, etc., and the memory may include a RAM. The control circuit may perform a control operation, the ALU may perform an arithmetic operation of binary bit information, the instruction interpreter, including an interpreter, compiler, etc., may perform an operation of converting a high-level language into a machine language or a machine language into a high-level language, and the registry may be involved in software data storage. Due to the above-described configuration, for example, a data operation processing speed may be rapidly increased at the beginning of the operation of the interior design server 110' by copying a program stored in the interior simulation unit 1520, loading the program into the memory, that is, a RAM, and then executing the program.

Figure 16:
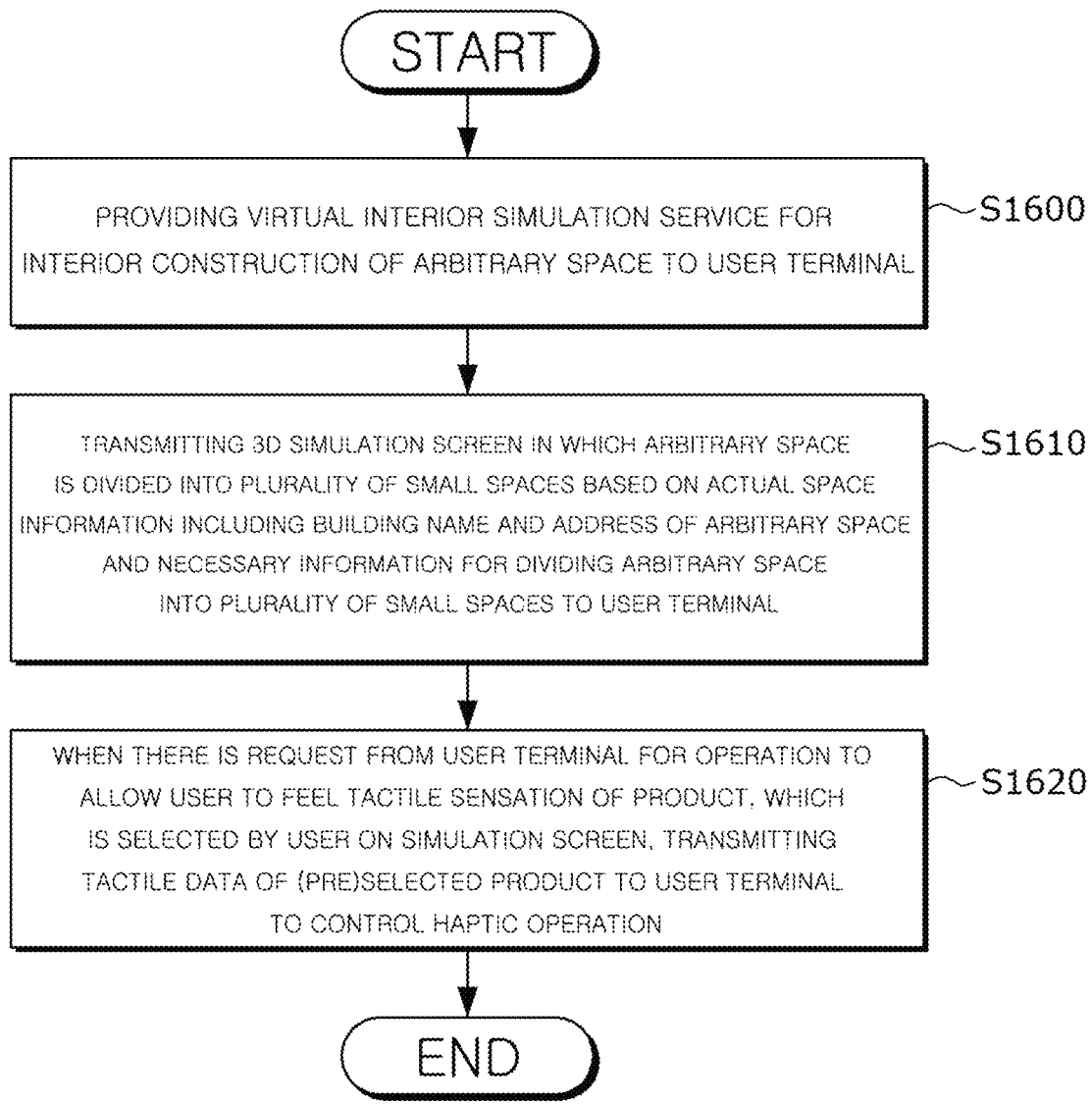
FIG. 16 is a flowchart showing a driving process of an interior design server according to another embodiment of the present invention.

FIG. 16 is a flowchart showing a driving process of the interior design server according to another embodiment of the present invention.

For convenience of description, referring to FIG. 16 together with FIG. 1, the interior design server 110 of FIG. 1 according to another embodiment of the present invention provides a virtual interior simulation service for interior construction of an arbitrary space to the user terminal 100 (S1600).

In addition, the interior design server 110 receives actual space information including a building name and an address of the arbitrary space and necessary information for dividing the arbitrary space into a plurality of small spaces (e.g., whether or not to install a door, the number of small spaces, an intensity of illumination, etc.), and transmits a 3D simulation screen, in which the arbitrary space is divided into the plurality of small spaces on the basis of the received information, to the user terminal 100 (S1610).

Further, when there is a request from the user terminal 100 for an operation to allow a user to feel a tactile sensation of a product, which is selected by the user on the simulation screen, the interior design server 110 transmits tactile data of the selected product to the user terminal 100 to control the haptic operation (S1620).

For example, in a case in which the user terminal 100 is an image display device such as a tablet PC including a touch screen, when the product on the screen is touched, a small-sized vibration motor configured below the corresponding touch panel is operated on the basis of the tactile data, that is, haptic data to allow the user to feel the tactile sensation. Alternatively, in a case in which a haptic function is configured in a mouse pad, the same haptic operation described above may be implemented through the corresponding mouse pad. In other words, the haptic data may be transmitted from the interior design server 110 to the mouse pad, and based on the haptic data, the vibration motor may be operated to implement the haptic operation. Of course, the transmission of the haptic data to the mouse pad may be provided through short-range wireless communication such as Bluetooth through a peripheral computer, and thus the embodiments of the present invention may not be limited to any one transmission form.

In addition to the above-described contents, the interior design server 110 of FIG. 1 may perform various operations, and since the other details have been sufficiently described above, contents thereof will be replaced with the contents sufficiently described above.

On the other hand, even if it is described that all constituent elements that constitute an exemplary embodiment of the present disclosure are coupled into one to perform operation, the present disclosure is not essentially limited to such an exemplary embodiment. That is, within the purpose range of the present disclosure, all the constituent elements may be selectively coupled into one or more to perform operation. Further, although each of the constituent elements may be implemented by independent hardware (e.g., a hardware processor), a part or the whole of the constituent elements may be selectively combined and implemented as a computer program having a program module that performs functions of a part or the whole of one or a plurality of combined hardware configurations. Codes and code segments that constitute the computer program may be easily reasoned by those skilled in the art to which the present disclosure pertains. Such a computer program may be stored in a non-transitory computer readable medium to be read and executed by the computer to implement an exemplary embodiment of the present disclosure.

Here, the non-transitory computer readable medium is not a medium that stores data for a short period, such as a register, a cache, or a memory, but means a medium which semi-permanently stores data and is readable by a device. Specifically, various applications and programs as described above may be stored and provided in the non-transitory computer readable medium, such as, a CD, a DVD, a hard disc, a Blu-ray disc, a USB, a memory card, and a ROM.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. An interior design product fabricating system comprising:
   a user terminal configured to request a virtual interior simulation service for interior construction of an arbitrary space to provide actual space information including a building name and an address of the arbitrary space and necessary information for dividing the arbitrary space into a plurality of small spaces; and
   an interior design server configured to provide the virtual interior simulation service to the user terminal and transmit a three-dimensional (3D) simulation screen, in which the arbitrary space is divided into the plurality of small spaces on a basis of the actual space information and the necessary information, to the user terminal,
   wherein, when there is a request from the user terminal for an operation to feel a tactile sensation of a product selected on the simulation screen, the interior design server transmits tactile data of the selected product to the user terminal to control a haptic operation,
   wherein, when it is determined that a user of the user terminal performs a drag operation after touching an arbitrary product, the interior design server controls the haptic operation by providing tactile data of the arbitrary product on athe basis of information sensed by a sensor from the user terminal,
   wherein the interior design server determines a corresponding operation comprising the drag operation after touching through a sensing signal of the sensor,
   wherein
   the user terminal, in a case of a desktop computer or a laptop computer, includes a mouse configured to perform the haptic operation, and
   a click button of the mouse includes a vibration motor configured to generate vibrations on a basis of the tactile data, and a communication unit configured to receive the tactile data,
   wherein the interior design server generates tactile data of the products by changing an amplitude, a frequency, and a period (T) of a control signal for controlling the haptic operation of the user terminal,
   wherein, when the arbitrary space is divided into the plurality of small spaces on the basis of the actual space information and the necessary information, the interior design server determines a space division form on the basis of a deep learning result of artificial intelligence (AI),
   wherein when the space division form is determined by the deep learning, the interior design server further reflects interior trend information by period to determine the space division form,
   wherein when there is data to prove that a color of lighting increases a learning effect, the interior design server is configured to,
   i) adjust one or more color lighting parameters so as to visually expand or reduce a perceived dimension of each of the plurality of small spaces,
   ii) update the space division form in accordance with the adjusted color lighting parameters to enhance the learning effect, and
   iii) modify illumination intensity, lighting positions, or light reflection to reflect a trend that the color of lighting contributes to the learning effect,
   wherein the interior design server provides a space division form of candidate group to a user and determines a space division form selected by the user from among a space division form of the provided candidate group as optimal space division that satisfies all user-required conditions,
   wherein the interior design server creates a virtual 3D simulation space of the space division form by using a drawing secured on a basis of building information of a building name and an address provided by the user in order to transmit a 3D simulation screen divided into a plurality of small spaces to the user terminal before construction is made for the arbitrary space, and
   wherein in the case in which the artificial intelligence is used, when there is no the space division form that satisfies all user-required conditions of the user, the interior design server recommends a space division form related to an interior construction of another user of a same type of industry to the user.

2. The interior design product fabricating system of claim 1, wherein the interior design server uses information, including a form and a size of a partition wall, the number of persons to be accommodated in each of the small spaces, and an intensity of illumination, as the necessary information.

3. The interior design product fabricating system of claim 2, further comprising a 3D product output center configured to output a 3D printing output according to the form and size of the partition wall applied on the 3D simulation screen, wherein the interior design server transmits 3D printing information including thickness information, internal structure information, and material information on the partition wall to the 3D product output center.

4. The interior design product fabricating system of claim 1, wherein the interior design server controls the haptic operation by providing tactile data of an arbitrary product on a basis of the response of a pop-up window provided when a user of the user terminal touches the arbitrary product.

* * * * *